United States Patent
Lim et al.

(10) Patent No.: US 9,384,894 B2
(45) Date of Patent: Jul. 5, 2016

(54) DIELECTRIC COMPOSITION TO BE SINTERED AT LOW TEMPERATURE, MULTILAYER CERAMIC ELECTRONIC COMPONENT CONTAINING THE SAME, AND METHOD OF MANUFACTURING THE MULTILAYER CERAMIC ELECTRONIC COMPONENT

(71) Applicant: SAMSUNG ELECTRO-MECHANICS CO., LTD., Suwon-Si, Gyeonggi-Do (KR)

(72) Inventors: Jong Bong Lim, Suwon-Si (KR); Seok Hyun Yoon, Suwon-Si (KR); Doo Young Kim, Suwon-Si (KR); Sang Huk Kim, Suwon-Si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 29 days.

(21) Appl. No.: 14/258,969

(22) Filed: Apr. 22, 2014

(65) Prior Publication Data

US 2015/0221438 A1    Aug. 6, 2015

(30) Foreign Application Priority Data

Feb. 4, 2014    (KR) .................. 10-2014-0012381

(51) Int. Cl.
*C04B 35/468*    (2006.01)
*H01G 4/12*     (2006.01)
*H01G 4/30*     (2006.01)

(52) U.S. Cl.
CPC .......... *H01G 4/1227* (2013.01); *C04B 35/4682* (2013.01); *H01G 4/30* (2013.01); *C04B 2235/3203* (2013.01); *C04B 2235/3215* (2013.01); *C04B 2235/3217* (2013.01); *C04B 2235/3224* (2013.01); *C04B 2235/3244* (2013.01); *C04B 2235/3263* (2013.01); *C04B 2235/3282* (2013.01); *C04B 2235/3418* (2013.01); *Y10T 29/435* (2015.01)

(58) Field of Classification Search
CPC ..................... C04B 35/4682; H01G 4/1227
See application file for complete search history.

(56) References Cited

U.S. PATENT DOCUMENTS 4,764,494 A * 8/1988 Sakabe ............... C04B 35/4682
                                                501/136
2008/0030921 A1    2/2008 Kaneda et al.

FOREIGN PATENT DOCUMENTS

JP    2001302342    * 10/2001
KR    10-2008-0012178 A    2/2008

* cited by examiner

*Primary Examiner* — Karl Group
(74) *Attorney, Agent, or Firm* — McDermott Will & Emery LLP

(57) ABSTRACT

A dielectric composition to be sintered at low temperature may include $BaTiO_3$ as a major component; and $(1-x)Li_2O\text{-}xCuO$ as a minor component, wherein x is 0.1 to 0.9, and the minor component is contained in a content of 0.1 mol % to 2.0 mol % based on 100 mol % of the major component.

11 Claims, 10 Drawing Sheets

| Ts (°C) | 0.3Li₂O-mCuO | | | | |
|---|---|---|---|---|---|
| | m=0 | m=0.1 | m=0.2 | m=0.3 | m=0.4 |
| 1135°C | | | | | |
| 1094°C | | | | | |
| 1081°C | | | | | |
| 1051°C | | | | | |
| 1021°C | | | | | |
| 995°C | | | | | |
| 955°C | | | | | |

FIG. 1

DIELECTRIC COMPOSITION TO BE SINTERED AT LOW TEMPERATURE, MULTILAYER CERAMIC ELECTRONIC COMPONENT CONTAINING THE SAME, AND METHOD OF MANUFACTURING THE MULTILAYER CERAMIC ELECTRONIC COMPONENT

CROSS-REFERENCE TO RELATED APPLICATION

This application claims the benefit of Korean Patent Application No. 10-2014-0012381 filed on Feb. 4, 2014, with the Korean Intellectual Property Office, the disclosure of which is incorporated herein by reference.

BACKGROUND

The present disclosure relates to a dielectric composition to be sintered at low temperature, a multilayer ceramic electronic component containing the same and a method of manufacturing the multilayer ceramic electronic component.

In accordance with the recent trend toward miniaturization and high performance of an electronic product using a multilayer ceramic capacitor (MLCC), the multilayer ceramic capacitor used therein has gradually miniaturized and had high capacitance.

That is, as microminiaturization and super capacitance of the multilayer ceramic capacitor have been required, ceramic layers for generating a capacitance have become thinned and highly stacked, and accordingly, the multilayer ceramic capacitor is required to stably generate capacitance and have a low dissipation factor and high reliability.

Particularly, in order to secure super high capacitance in a small multilayer ceramic capacitor, dielectric layers should be ultra-thin.

In order to achieve high reliability while having high capacitance and the low dissipation factor in the ultra-thin layers, a dielectric composition having excellent dielectric properties is important, but connectivity of internal electrodes alternately stacked with at least one of the dielectric layers interposed therebetween is also important.

In the case of manufacturing a multilayer ceramic capacitor using a dielectric material containing $BaTiO_3$, when a sintering temperature exceeds 1200° C., nickel internal electrodes may be shrunk and agglomerated. In this case, stress may be generated in the multilayer ceramic capacitor due to a difference in shrinkage behavior between the internal electrodes and the dielectric layers.

In addition, as the nickel internal electrodes are shrunk and agglomerated, a possibility of occurrence of a short-circuit is rapidly increased, and connectivity or coverage of the electrodes is decreased due to oxidation of the internal electrodes, resulting in a decrease in capacitance.

Further, it is highly likely to deteriorate reliability due to a decrease in insulation resistance at a high temperature (>1200° C.)

Therefore, a dielectric composition capable of being sintered at a low temperature of 1200° C. or lower has been required.

SUMMARY

An exemplary embodiment in the present disclosure may provide a dielectric composition capable of being sintered at a low temperature, and a multilayer ceramic electronic component manufactured using the dielectric composition.

According to an exemplary embodiment in the present disclosure, a dielectric composition to be sintered at low temperature may contain: $BaTiO_3$ as a major component; and as a minor component, wherein x is 0.1 to 0.9, and the minor component is contained in a content of 0.1 mol % to 2.0 mol % based on 100 mol % of the major component.

The minor component may be contained in a content of 0.1 mol % to 1.0 mol % based on 100 mol % of the major component.

The minor component may be at least one selected from a group consisting of $Li_6CuO_4$, $Li_2CuO_2$, and $Li_2Cu_2O_3$, or a mixture thereof.

The minor component may have a melting point of 1020° C. or lower.

The dielectric composition may further contain: 1.0 mol % of BaO; 0.3 mol % of $SiO_2$; and 1.0 mol % of $Al_2O_3$, as first auxiliary components, based on 100 mol % of the major component.

The dielectric composition may further contain: 1.0 mol % of $Mn_3O_4$; 1.1 mol % of $ZrO_2$; and 5.2 mol % of $Dy_2O_3$, as second auxiliary components, based on 100 mol % of the major component.

According to another aspect of the present disclosure, a multilayer ceramic electronic component may include: a multilayer body formed by stacking a plurality of dielectric layers containing $BaTiO_3$ as a major component and (1-x)$Li_2$O-xCuO as a minor component; first and second internal electrodes alternately stacked on the dielectric layers and having different polarities; a first external electrode formed on a surface of the multilayer body to be electrically connected to the first internal electrodes; and a second external electrode formed on a surface of the multilayer body opposing the surface thereof having the first external electrode formed thereon to be electrically connected to the second internal electrodes, wherein x is 0.10 to 0.90, and the minor component is contained in a content of 0.1 mol % to 2.0 mol % based on 100 mol % of the major component.

The minor component may be contained in a content of 0.1 mol % to 1.0 mol % based on 100 mol % of the major component.

The minor component may be at least one selected from a group consisting of $Li_6CuO_4$, $Li_2CuO_2$, and $Li_2Cu_2O_3$, or a mixture thereof.

The minor component may have a melting point of 1020° C. or lower.

The dielectric layers may have a degree of densification of 97% or higher.

The dielectric layers may further contain: 1.0 mol % of BaO; 0.3 mol % of $SiO_2$; and 1.0 mol % of $Al_2O_3$, as first auxiliary components, based on 100 mol % of the major component.

The dielectric layers may further contain: 1.0 mol % of $Mn_3O_4$; 1.1 mol % of $ZrO_2$; and 5.2 mol % of $Dy_2O_3$, as second auxiliary components, based on 100 mol % of the major component.

According to another aspect of the present disclosure, a method of manufacturing a multilayer ceramic electronic component may include: preparing a dielectric composition to be sintered at low temperature containing $BaTiO_3$ as a major component and (1-x)$Li_2$O-xCuO as a minor component; preparing ceramic green sheets using the dielectric composition; forming internal electrodes on the ceramic green sheets; stacking and compressing the ceramic green sheets to prepare a ceramic multilayer body; and sintering the ceramic multilayer body, wherein x is 0.10 to 0.90, and the minor component is contained in a content of 0.1 mol % to 2.0 mol % based on 100 mol % of the major component.

The sintering of the ceramic multilayer body may be performed at 1000° C. to 1150° C.

BRIEF DESCRIPTION OF DRAWINGS

The above and other aspects, features and other advantages of the present disclosure will be more clearly understood from the following detailed description taken in conjunction with the accompanying drawings, in which:

FIG. 1 illustrates changes in colors of ceramic multilayer bodies sintered at respective sintering temperatures, the ceramic multilayer bodies being manufactured using dielectric compositions in which ratios of minor components of the dielectric compositions to be sintered at low temperature according to an exemplary embodiment of the present disclosure have been adjusted;

DETAILED DESCRIPTION

Figure 2:
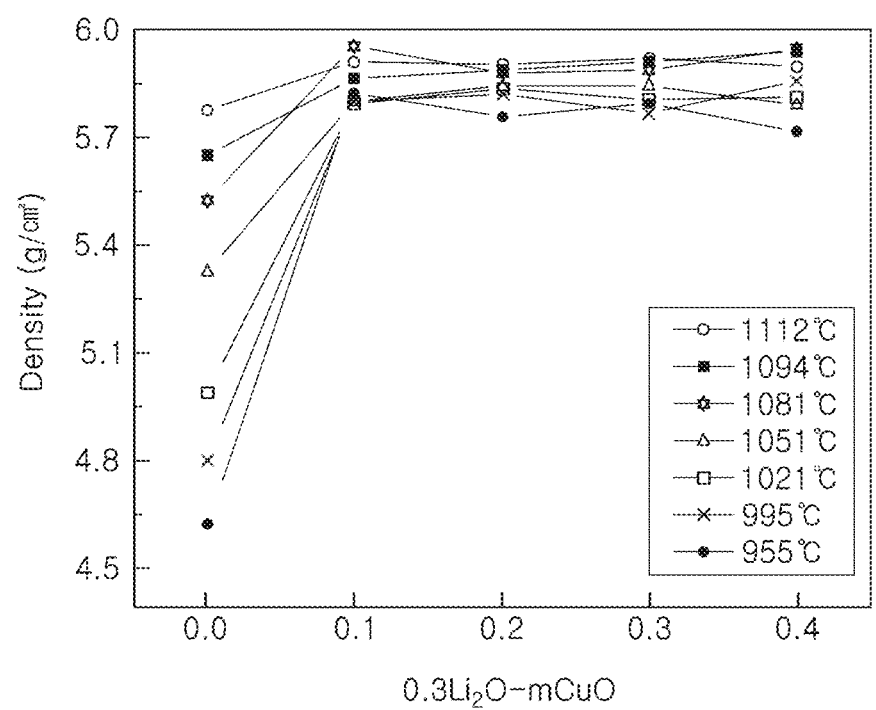
FIG. 2 illustrates results obtained by measuring densities of ceramic multilayer bodies sintered at respective sintering temperatures, the ceramic multilayer bodies being manufactured using dielectric compositions in which ratios of minor components of the dielectric compositions capable of being sintered at low temperature according to an exemplary embodiment of the present disclosure have been adjusted.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In the accompanying drawings, an X-direction refers to a length direction, a y-direction refers to a width direction, and a z-direction refers to a thickness direction.

A multilayer ceramic electronic component according to an exemplary embodiment of the present disclosure may include a multilayer ceramic capacitor, a multilayer varistor, a thermistor, a piezoelectric element, a multilayer substrate, or the like, each of which has a structure in which ceramic dielectric layers are stacked and internal electrodes are arranged to face each other having each of the dielectric layers interposed therebetween.

Dielectric Composition to be Sintered at Low Temperature

A dielectric composition to be sintered at low temperature according to an exemplary embodiment of the present disclosure may contain $BaTiO_3$ as a major component and $(1-x)Li_2O-xCuO$ as a minor component.

The dielectric composition to be sintered at low temperature according to an exemplary embodiment of the present disclosure may contain $BaTiO_3$ as a major component.

$BaTiO_3$-based dielectric powder generally used in a ceramic electronic component may be used, and $(Ba_{1-a}Ca_a)TiO_3$, $Ba(Ti_{1-b}Ca_b)O_3$, $(Ba_{1-a}Ca_a)(Ti_{1-b}Zr_b)O_3$, or $Ba(Ti_{1-b}Zr_b)O_3$ in which Ca, Zr, or the like, is partially dissolved in $BaTiO_3$ may also be used.

An average particle size of the $BaTiO_3$-based powder may be 0.05 μm to 0.5 μm, but is not limited thereto.

The dielectric composition to be sintered at low temperature according to an exemplary embodiment of the present disclosure may contain $(1-x)Li_2O-xCuO$ as a minor component.

A phase of the minor component may be changed according to a range of values of x.

As the phase of the minor component is changed, a melting point of the minor component may be changed.

In order to lower the melting point of the minor component to 1020° C. or lower, the values of x may be 0.10 to 0.90.

In the case in which the range of values of x in the minor component is 0.10 to 0.90, the minor component may be at least one selected from a group consisting of $Li_6CuO_4$, $Li_2CuO_2$, and $Li_2Cu_2O_3$, or a mixture thereof.

$Li_6CuO_4$, $Li_2CuO_2$, and $Li_2Cu_2O_3$ have a melting point of 1020° C. or lower.

FIG. 1 illustrates changes in colors of ceramic multilayer bodies sintered at respective sintering temperatures, the ceramic multilayer bodies being manufactured using dielectric compositions in which ratios of minor components of the dielectric compositions to be sintered at low temperature according to an exemplary embodiment of the present disclosure have been adjusted.

Hereinafter, in order to clearly explain and compare features of the dielectric compositions to be sintered at low temperature, $(1-x)Li_2O-xCuO$ will be described by using $0.3Li_2O-mCuO$ of which only amounts of CuO are changed in Inventive Examples and Comparative Examples.

In the Examples, the dielectric compositions to be sintered at low temperature were prepared by adding 1.0 mol % of $0.3Li_2O-mCuO$ (m=0, 0.1, 0.2, 0.3, or 0.4) as the minor component based on 100 mol % of $BaTiO_3$ as the major component, with other auxiliary components under the same conditions, except for values of m.

Since a degree of densification of the ceramic sintered body is changed in sintering the ceramic multilayer body, a color thereof is changed accordingly.

Referring to FIG. 1, it can be seen that when m was 0 and a sintering temperature was 1112° C., the sintering of the ceramic multilayer body was sufficiently performed, such that the ceramic sintered body had a dark color.

However, it can be seen that when the sintering temperature was lower than about 1110° C., a color of the ceramic sintered body after sintering was bright.

That is, it can be seen that in the case in which the minor component was only formed of $Li_2O$, the sintering of the ceramic multilayer body was not properly performed at a temperature lower than 1110° C.

On the contrary, it can be seen that when m was 0.1 (=$0.75Li_2O$-$0.25CuO$), a change in color after sintering was insignificant even when a result of comparing sintering temperatures of 955° C. and 1112° C. was considered.

That is, it can be seen that when m was 0.1, even in the case that the sintering temperature was 955° C., the sintering of the ceramic multilayer body was properly performed, whereby a degree of densification of the ceramic sintered body was improved.

Further, it can be seen that when m was 0.2 (=$0.6Li_2O$-$0.4CuO$), 0.3 (=$0.5Li_2O$-$0.5CuO$), or 0.4 (=$0.43Li_2O$-$0.57CuO$), a change in color after sintering was also insignificant even when a result of comparing sintering temperatures of 955° C. and 1112° C. was considered.

Since pure CuO has a significantly high melting point of 1300° C. or higher, pure CuO is not suitable for being used as a sintering additive for low-temperature sintering.

However, it may be seen that in the case of using a (1-x)$Li_2O$-$xCuO$ compound as in an exemplary embodiment of the present disclosure, a melting point thereof may be lowered, and accordingly, even when the sintering temperature is 1020° C. or lower, the (1-x)$Li_2O$-$xCuO$ compound may be in a liquid phase and low-temperature densification may be induced.

FIG. 2 illustrates results obtained by measuring densities of ceramic multilayer bodies sintered at respective sintering temperatures, the ceramic multilayer bodies being manufactured using dielectric compositions in which ratios of minor components of the dielectric compositions capable of being sintered at low temperature according to an exemplary embodiment of the present disclosure have been adjusted.

Referring to FIG. 2, it can be seen that when m was 0, the density of the ceramic sintered body after sintering was rapidly changed according to sintering temperatures.

That is, it can be seen that when m was 0, in a case in which the sintering temperature of the ceramic multilayer body was lowered, density of the ceramic sintered body was significantly low.

However, it can be seen that when m was 0.1 (=$0.75Li_2O$-$0.25CuO$), a change in density after sintering was insignificant even when a result of comparing sintering temperatures of 955° C. and 1112° C. was considered.

Further, it can be seen that when m was 0.2 (=$0.6Li_2O$-$0.4CuO$), 0.3 (=$0.5Li_2O$-$0.5CuO$), or 0.4 (=$0.43Li_2O$-$0.57CuO$), a change in density after sintering was also insignificant even when a result of comparing sintering temperatures of 955° C. and 1112° C. was considered.

Since pure CuO has a significantly high melting point of 1300° C. or higher, pure CuO is not suitable for being used as a sintering additive for low-temperature sintering.

However, it may be seen that in the case of using a (1-x)$Li_2O$-$xCuO$ compound as in an exemplary embodiment of the present disclosure, a melting point thereof may be lowered, and accordingly, even when the sintering temperature is 1020° C. or lower, the (1-x)$Li_2O$-$xCuO$ compound may be in a liquid phase and low-temperature densification may be induced.

These results correspond to the results illustrated in FIG. 1.

Therefore, it may be seen that the (1-x)$Li_2O$-$xCuO$ compound, which is the minor component in Inventive Examples, may induce densification of $BaTiO_3$ at a low temperature, thereby lowering the sintering temperature.

Figure 3:
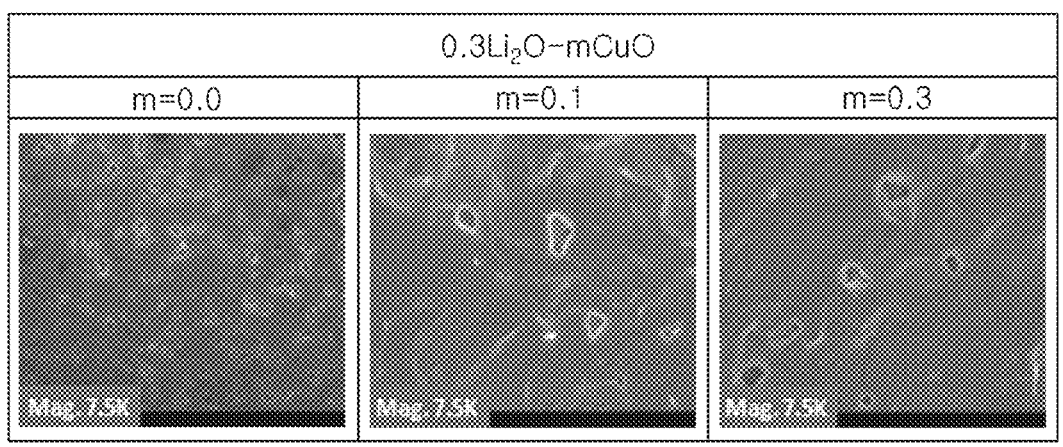
FIG. 3 is photographs showing a microstructure of a ceramic multilayer body after being sintered at 1094° C.

FIG. 3 is photographs showing a microstructure of a ceramic body after being sintered at 1094° C.

Referring to FIG. 3, it may be seen that when m was 0, particles were significantly small and many pores were present in the microstructure.

However, it can be seen that when m was 0.1 (=$0.75Li_2O$-$0.25CuO$) or 0.3 (=$0.5Li_2O$-$0.5CuO$), a liquid phase was formed by the minor component, resulting in a dense microstructure.

In addition, it may be seen that when m was 0.1 or 0.3, the number of pores was significantly reduced.

That is, in view of the microstructure, when the dielectric composition to be sintered at low temperature contains the (1-x)$Li_2O$-$xCuO$ compound as the minor component, a liquid phase may be formed by the minor component at a relatively low temperature as compared with the related art, whereby densification and particle growth may be induced.

Figure 4:
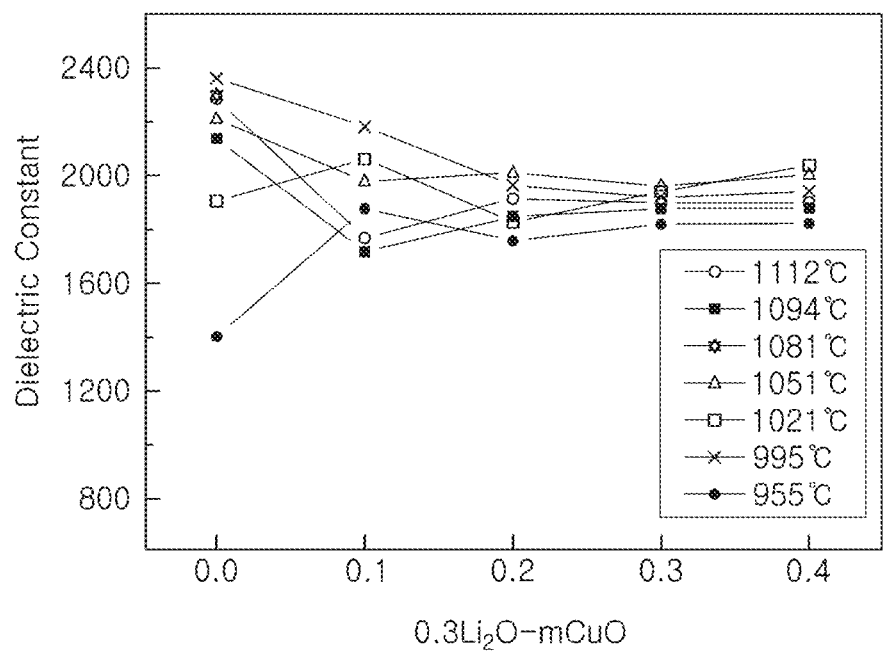
FIGS. 4 and 5 illustrate results obtained by measuring dielectric constants and dissipation factors of ceramic multilayer bodies sintered at respective sintering temperatures, the ceramic multilayer bodies being manufactured using dielectric compositions in which ratios of minor components of the dielectric compositions capable of being sintered at low temperature according to an exemplary embodiment of the present disclosure have been adjusted.
Figure 5:
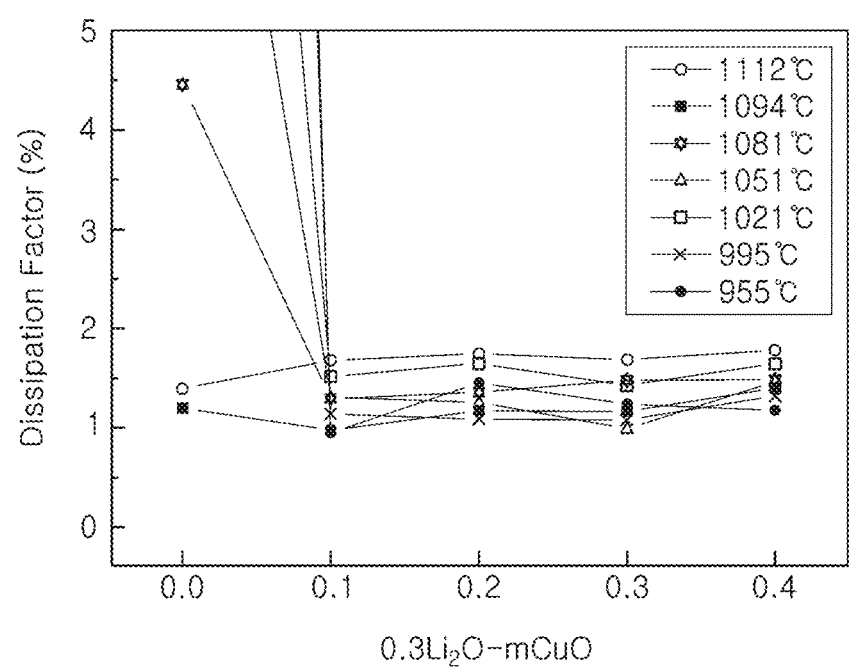

FIGS. 4 and 5 illustrate results obtained by measuring dielectric constants and dissipation factors of ceramic multilayer bodies sintered at respective sintering temperatures, the ceramic multilayer bodies being manufactured using dielectric compositions in which ratios of minor components of the dielectric compositions capable of being sintered at low temperature according to an exemplary embodiment of the present disclosure have been adjusted.

Referring to FIG. 4, it can be seen that when m in the minor component, $0.3Li_2O$-$mCuO$, was 0, as the sintering temperature was lowered, the dielectric constant was significantly decreased.

Particularly, referring to FIG. 5, it can be seen that when the sintering temperature was 1081° C. or lower and m was 0, the degree of densification of the ceramic sintered body was low, and accordingly, a decrease in dissipation factor was significantly increased as compared to a decrease in dielectric constant.

However, it can be seen that when m was 0.1 (=$0.75Li_2O$-$0.25CuO$), the dielectric constant was maintained at a level similar to that in the case in which m was 0, and dissipation factor characteristics were highly stable.

The reason is that in the case in which the dielectric composition to be sintered at low temperature contains the (1-x)$Li_2O$-$xCuO$ compound as the minor component, the liquid phase may be formed by the (1-x)$Li_2O$-$xCuO$ compound, and the dissipation factor may be stabilized by a B-site acceptor of some CuO moieties.

Therefore, in the case in which the dielectric composition to be sintered at low temperature according to an exemplary embodiment of the present disclosure contains the (1-x)$Li_2O$-$xCuO$ compound as the minor component, dielectric properties may be improved.

Figure 6:
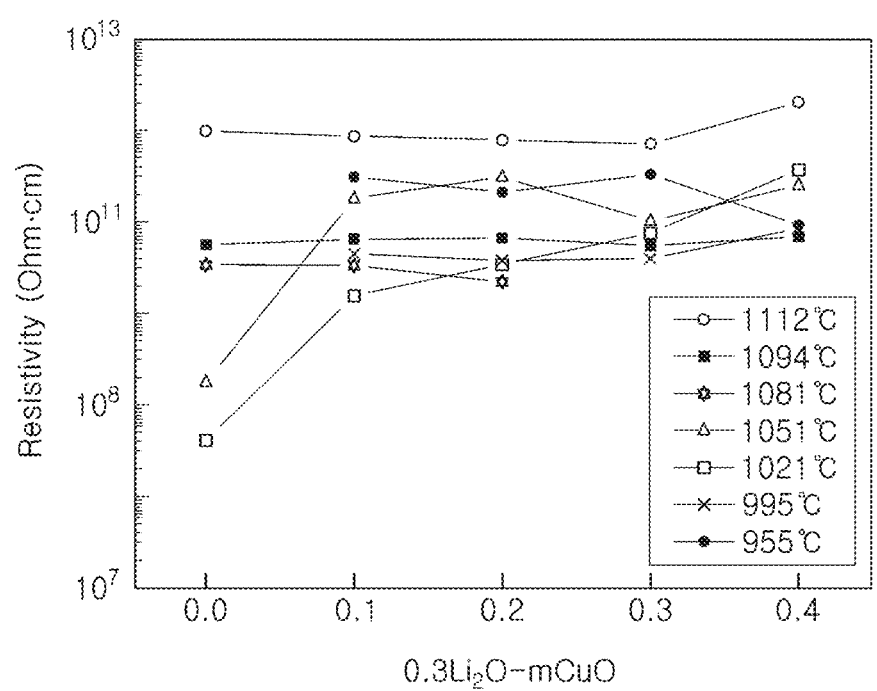
FIG. 6 illustrates results obtained by measuring insulation resistance (IR) of ceramic multilayer bodies at room temperature, after being sintered at respective sintering temperatures, the ceramic multilayer bodies being manufactured using dielectric compositions in which ratios of minor components of the dielectric compositions capable of being sintered at low temperature according to an exemplary embodiment of the present disclosure have been adjusted.

FIG. 6 illustrates results obtained by measuring insulation resistance (IR) of ceramic multilayer bodies at room temperature, after being sintered at respective sintering temperatures, the ceramic multilayer bodies being manufactured using dielectric compositions in which ratios of minor components of the dielectric compositions capable of being sintered at low temperature according to an exemplary embodiment of the present disclosure have been adjusted.

Referring to FIG. 6, it can be seen that when m in 0.3Li$_2$O-mCuO was 0, insulation properties significantly deteriorated at a sintering temperature of 1051° C.

The reason is that when the sintering temperature is 1051° C. or lower, the sintering of the ceramic multilayer body is not properly performed, and accordingly, sintering density may be lowered due to a decrease in the degree of densification.

On the other hand, it can be seen that when m was 0.1 to 0.4, even in the case in which the sintering temperature was lowered, deterioration in the insulation properties was insignificant, as compared to the case in which m was 0.

In addition, it can be seen that when an amount of CuO was increased, the insulation properties were further improved.

That is, it may be seen that as the sintering temperature is lowered, the insulation properties at low temperature may be closely associated with the degree of densification.

Therefore, since densification of the ceramic multilayer body using the dielectric composition capable of being sintered at low temperature according to the exemplary embodiment of the present disclosure is properly implemented even at low temperature, the insulation properties of the ceramic multilayer body may be improved as compared to the related art.

Figure 7:
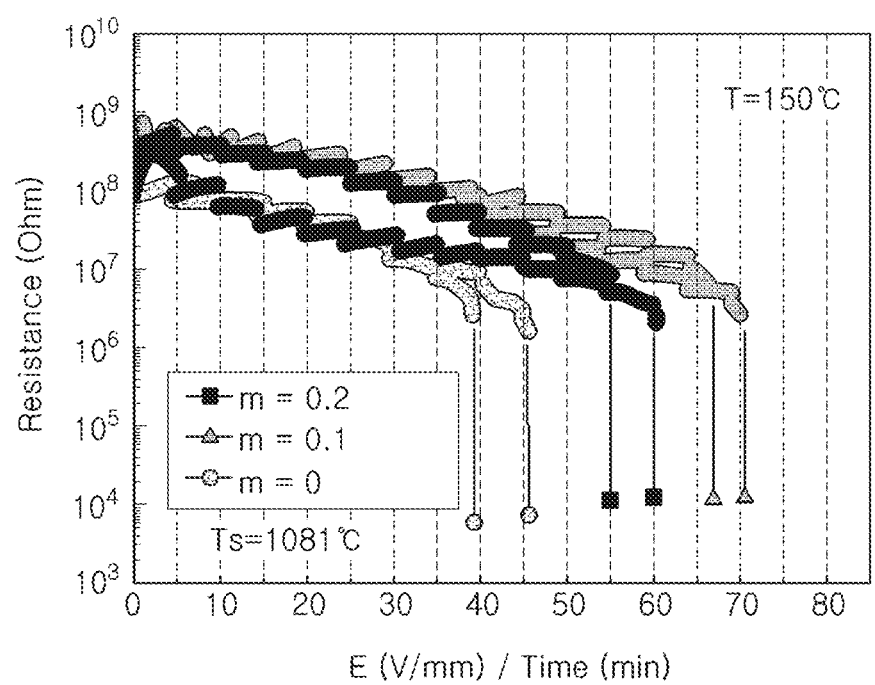
FIG. 7 illustrates results obtained by measuring insulation resistance (IR) of ceramic multilayer bodies according to an electric field at high temperature, after being sintered at respective sintering temperatures, the ceramic multilayer bodies being manufactured using dielectric compositions in which ratios of minor components of the dielectric compositions capable of being sintered at low temperature according to an exemplary embodiment of the present disclosure have been adjusted.

FIG. 7 illustrates results obtained by measuring insulation resistance (IR) of ceramic multilayer bodies according to an electric field at high temperature, after being sintered at respective sintering temperatures, the ceramic multilayer bodies being manufactured using dielectric compositions in which ratios of minor components of the dielectric compositions capable of being sintered at low temperature according to an exemplary embodiment of the present disclosure have been adjusted.

Referring to FIG. 7, it can be seen that when m in 0.3Li$_2$O-mCuO was o, a breakdown voltage was low (43V/mm).

That is, it may be seen that as sintering density was lowered, a breakdown voltage was lowered due to the pores remaining in the ceramic multilayer body.

On the other hand, it may be seen that when m was 0.1 and 0.2, breakdown voltages were about 58 v/mm and 67 v/mm, respectively. In these cases, the insulation properties were superior as compared to the case in which m was 0.

The reason is that in the case in which the dielectric composition to be sintered at low temperature contains the (1-x) Li$_2$O-xCuO compound as the minor component, a liquid phase may be formed by the (1-x)Li$_2$O-xCuO compound, the degree of densification may be improved and the sintering density may be increased.

The following seven dielectric compositions as shown in Table 1 were prepared by adjusting a content of (1-x)Li$_2$O-xCuO, the minor component.

As shown in [Table 1], the dielectric composition to be sintered at low temperature according to an exemplary embodiment of the present disclosure may further contain 1.0 mol % of BaO, 0.3 mol % of SiO$_2$, and 1.0 mol % of Al$_2$O$_3$ as first auxiliary components, based on 100 mol % of the major component.

The first auxiliary components, sintering additives, may serve to assist in adjusting a sintering temperature, a degree of densification, IR properties, and the like.

In addition, the dielectric composition to be sintered at low temperature according to an exemplary embodiment of the present disclosure may further contain 1.0 mol % of Mn$_3$O$_4$; 1.1 mol % of V$_2$O$_5$, and 5.2 mol % of Dy$_2$O$_3$ as secondary auxiliary components, based on 100 mol % of the major component.

The secondary auxiliary components do not largely affect the dielectric constant and may suppress particle growth of the dielectric composition or control movement of oxygen vacancy to thereby improve sintering properties, insulation resistance, insulation breakdown voltage, an average lifetime, and the like.

Multilayer ceramic electronic components were manufactured using the compositions of Table 1, and dielectric properties and degrees of densification thereof were evaluated.

The dielectric properties were evaluated by measuring dielectric constants and dissipation factors, and the degrees of densification were evaluated by measuring densities of the multilayer ceramic electronic components.

As a result of evaluating the dielectric properties using the compositions of Table 1, it may be seen that in the cases of compositions #1, #2, and #7, dielectric properties deteriorated.

The reason is that the content of the major component may be relatively decreased due to an increase in the content of the minor component.

On the contrary, as a result of evaluating the degrees of densification of the compositions of Table 1, it may be seen that in the cases of compositions #1 and #2, the densities of the ceramic sintered bodies were low.

The reason is that a liquid phase may not be sufficiently formed due to lack of an amount of the minor component as the sintering additive for lowering the sintering temperature, resulting in failure of densification.

Therefore, in order to improve the dielectric properties and increase the degree of densification, the minor component may be contained in a content of 0.1 to 5.0 mol % based on 100 mol % of the major component.

Preferably, the minor component may be contained in a content of 0.1 to 2.0 mol % based on 100 mol % of the major component.

TABLE 1

| composition | Major Ingreident (mol %) BaTiO$_3$ | Minor Component (mol %, per 100 mol % of Major Component) (1-x)Li$_2$O—xCuO | First Auxiliary Component (mol %, per 100 mol % of Major Component) BaO:SiO$_2$:Al$_2$O$_3$ | Second Auxiliary Component (mol %, per 100 mol % of Major Component) Mn$_3$O$_4$:V$_2$O$_5$:Dy$_2$O$_3$ |
|---|---|---|---|---|
| #1* | 100 | 0 | 1.0:0.3:1.0 | 1.0:1.1:5.2 |
| #2* | 100 | 0.05 | 1.0:0.3:1.0 | 1.0:1.1:5.2 |
| #3 | 100 | 0.1 | 1.0:0.3:1.0 | 1.0:1.1:5.2 |
| #4 | 100 | 0.3 | 1.0:0.3:1.0 | 1.0:1.1:5.2 |
| #5 | 100 | 0.7 | 1.0:0.3:1.0 | 1.0:1.1:5.2 |
| #6 | 100 | 2.0 | 1.0:0.3:1.0 | 1.0:1.1:5.2 |
| #7* | 100 | 2.1 | 1.0:0.3:1.0 | 1.0:1.1:5.2 |

*Comparative Example

Multilayer Ceramic Electronic Component and Method of Manufacturing the Same

Figure 8:
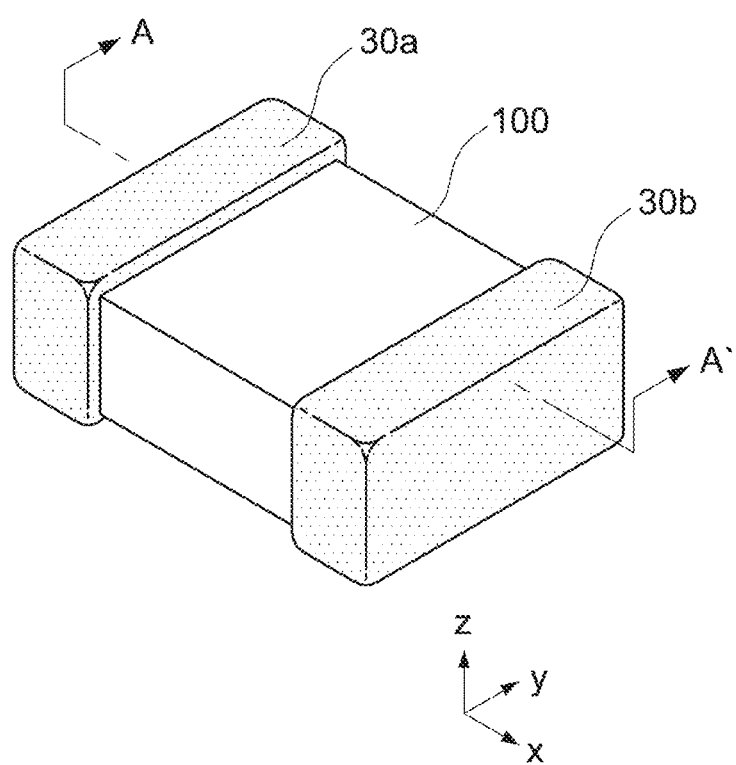
FIG. 8 is a perspective view of a multilayer ceramic electronic component according to another embodiment of the present disclosure.
Figure 9:
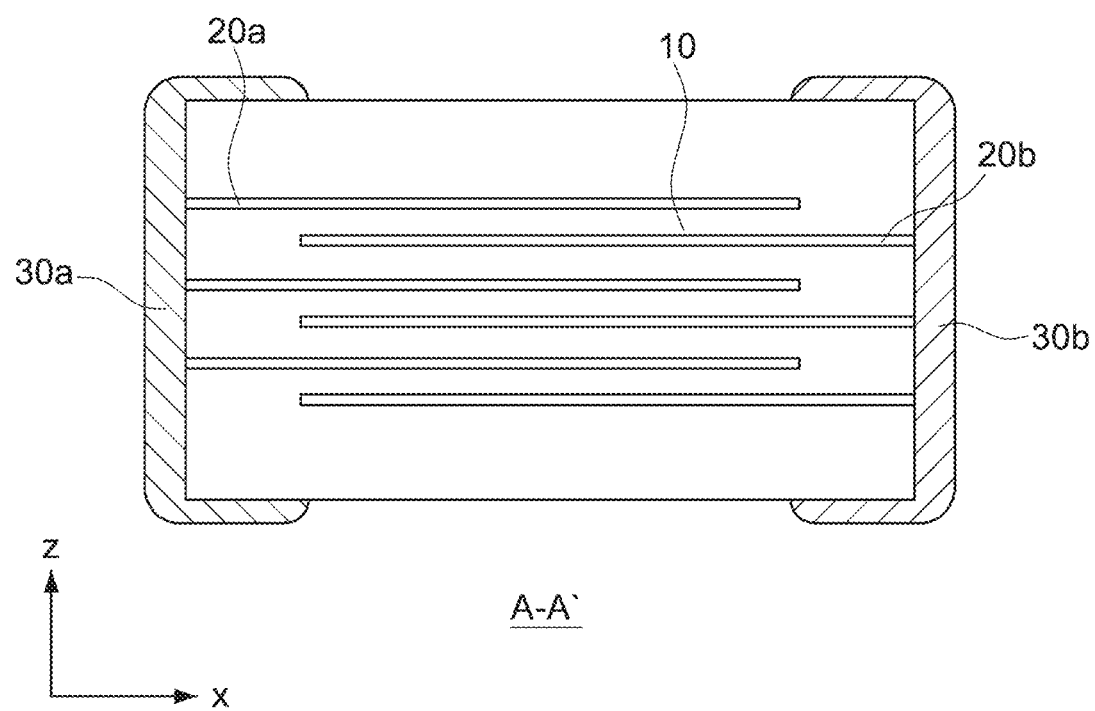
FIG. 9 is a cross-sectional view taken along line A-A' of FIG. 8.

FIG. 8 is a perspective view of a multilayer ceramic electronic component according to another embodiment of the present disclosure, and FIG. 9 is a cross-sectional view taken along line A-A' of FIG. 8.

Referring to FIGS. 8 and 9, a multilayer ceramic electronic component according to another exemplary embodiment of the present disclosure may include a multilayer body 100 formed by stacking a plurality of dielectric layers 10 containing $BaTiO_3$ as a major component and $(1-x)Li_2O-xCuO$ as a minor component; first and second internal electrodes 20a and 20b alternately disposed on the dielectric layers and having opposite polarities; a first external electrode 30a formed on one end surface of the multilayer body 100 to be electrically connected to the first internal electrodes 20a; and a second external electrode 30b formed on the other end surface of the multilayer body 100 opposing one end surface having the first external electrode 30a formed thereon to be electrically connected to the second internal electrodes 20b.

The dielectric layers 10 may be formed using the above-mentioned dielectric composition to be sintered at low temperature.

That is, the dielectric composition according to an exemplary embodiment of the present disclosure may allow the sintering process to be performed at a temperature lower than a temperature at which nickel internal electrodes are oxidized or agglomerated.

According to the related art, dielectric layers having a predetermined thickness or less may not be manufactured due to a short-circuit caused by a phenomenon that the nickel internal electrodes are agglomerated at high temperature.

However, in the multilayer ceramic electronic component according to an exemplary embodiment of the present disclosure, the dielectric layers are formed using the dielectric composition capable of being sintered at low temperature and are then sintered at low temperature, and thus, agglomeration in the nickel internal electrodes may hardly occur.

Therefore, even in the case in which the dielectric layers 10 become thin, reliability may not deteriorate, and high capacitance (high performance) may be secured.

Therefore, in the exemplary embodiment of the present disclosure, the thickness of the dielectric layer 10 may be 1 μm to 2 μm.

In the case in which the thickness of the dielectric layer 10 is less than 1 μm, the adjacent internal electrodes 20a and 20b may contact each other, causing the occurrence of a short-circuit, and in the case in which the thickness of the dielectric layer 10 exceeds 2 μm, it may be difficult to secure super high capacitance.

A degree of densification of the dielectric layers 10 may be 97% or higher.

According to the related art, in the case in which ceramic green sheets are sintered at 1000° C. to 1150° C., a degree of densification is lowered below 97%.

However, the dielectric layers 10 using the dielectric composition capable of being sintered at low temperature according to this exemplary embodiment of the present disclosure may obtain a degree of densification of 97% or higher.

The first internal electrodes 20a may be formed on the dielectric layers 10 to be electrically connected to the first external electrode 30a.

In addition, the second internal electrodes 20b may be formed on the dielectric layers 10 to be electrically connected to the second external electrode 30b.

The multilayer body 100 may be formed by alternately stacking the dielectric layers 10 including the first internal electrodes 20a formed thereon and the dielectric layers 10 including the second internal electrodes 20b formed thereon.

For example, the first and second internal electrodes 20a and 20b may have opposite polarities by connecting a positive (+) voltage to the first external electrode 30a and connecting a negative (−) voltage to the second external electrode 30b.

Therefore, dipoles may be formed in the dielectric layer 10 disposed between the first and second internal electrodes 20a and 20b, and thus, the multilayer ceramic electronic component according to the embodiment of the present disclosure may act as a capacitor.

The first and second external electrodes 30a and 30b may be formed on both end surfaces of the multilayer body in a length direction, respectively.

Figure 10:
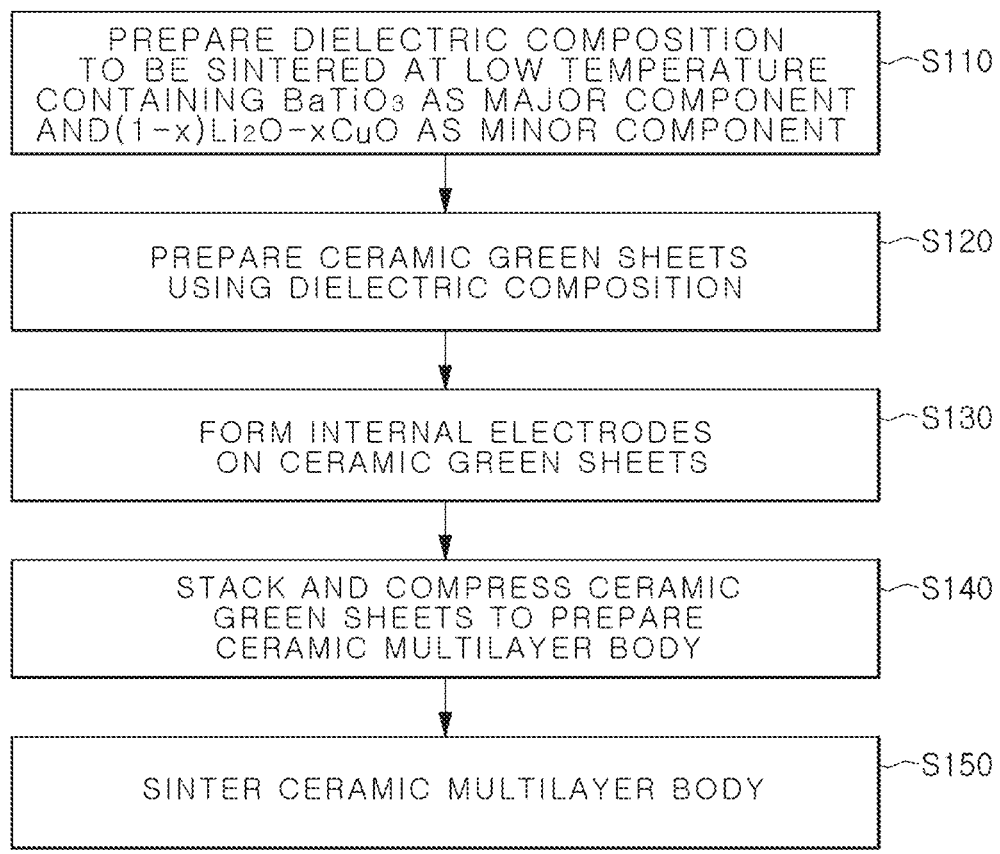
FIG. 10 is a flow-chart showing a method of manufacturing a multilayer ceramic electronic component according to another exemplary embodiment of the present disclosure.

FIG. 10 is a flowchart illustrating a method of manufacturing a multilayer ceramic electronic component according to another exemplary embodiment of the present disclosure.

Referring to FIG. 10, the method of manufacturing a multilayer ceramic electronic component according to another exemplary embodiment of the present disclosure may include: preparing a dielectric composition to be sintered at low temperature sintering containing $BaTiO_3$ as a major component and $(1-x)Li_2O-xCuO$ as an minor component (S110); preparing ceramic green sheets using the dielectric composition (S120); forming internal electrodes on the ceramic green sheets (S130); stacking the ceramic green sheets and compressing the stacked sheets to prepare a ceramic multilayer body (S140); and sintering the ceramic multilayer body (S150).

In the preparing of the dielectric composition (S110), in order to prepare $(1-x)Li_2O-xCuO$ used as a minor component, $Li_2O$ may be directly used or $Li_2CO_3$ may be used as a starting material of $Li_2O$, and CuO may be directly used or $Cu_2O$ may be used as a starting material of CuO.

After $Li_2O$ and CuO may be weighed at a suitable ratio, they may be mixed with each other and dried by a dry or wet (alcohol) process.

Thereafter, in order to form $(1-x)Li_2O-xCuO$, the composition may be maintained at a phase formation temperature of 500° C. to 750° C. for 60 minutes.

In the preparing of the ceramic green sheets (S120), the ceramic green sheets may be manufactured by mixing the dielectric composition to be sintered at low temperature, a binder, and a solvent with each other to prepare slurry and forming the prepared slurry as sheets having a thickness of several μm by a doctor blade method.

In addition, the internal electrodes may be formed on the ceramic green sheets using a conductive paste (S130).

The internal electrodes may be formed of a conductive paste composition containing conductive metal powder.

The conductive metal powder is not particularly limited. For example, silver (Ag), lead (Pb), platinum (Pt), nickel (Ni), copper (Cu), or the like, may be used alone, or a mixture thereof may be used.

After the internal electrodes are formed as described above, the ceramic multilayer body may be formed by separating the ceramic green sheets from carrier films and then stacking the plurality of green to be overlapped with each other (S140).

Next, the ceramic multilayer body may be compressed, sintered, cut, and polished (S150).

Particularly, since the multilayer ceramic electronic component according to the embodiment of the present disclosure uses the dielectric composition to be sintered at low temperature, the sintering process may be performed at 1000° C. to 1150° C.

Therefore, the agglomeration or oxidation of the internal electrodes may be prevented, whereby the capacitance (performance) and reliability of the multilayer ceramic electronic component may be improved.

The method of manufacturing a multilayer ceramic electronic component may further include forming external electrodes on the ceramic multilayer body to be electrically connected to the internal electrodes after the sintering of the ceramic multilayer body (S150).

The forming of the external electrodes may be performed on surfaces of the ceramic multilayer body in the length direction, that is, surfaces thereof to which the internal electrodes are exposed, using a conductive paste.

As set forth above, according to exemplary embodiments of the present disclosure, a dielectric composition to be sintered at low temperature contains $BaTiO_3$ as a major component and $(1-x)Li_2O$-$xCuO$ as a minor component to thereby lower a sintering temperature, such that the dielectric composition may be sintered at a low temperature and have a dense microstructure and excellent dielectric properties.

In addition, in a method of manufacturing a multilayer ceramic electronic component according to exemplary embodiments of the present disclosure, a sintering process may be performed at 1050° C. to 1150° C. by using the above-mentioned dielectric composition, whereby agglomeration of nickel internal electrodes may be prevented.

Further, a multilayer ceramic electronic component containing the dielectric composition to be sintered at low temperature according to exemplary embodiments of the present disclosure may have a high degree of densification, such that high capacitance may be obtained and agglomeration of nickel internal electrodes may be prevented by lowering a sintering temperature, whereby high reliability may be secured.

While exemplary embodiments have been shown and described above, it will be apparent to those skilled in the art that modifications and variations could be made without departing from the spirit and scope of the present disclosure as defined by the appended claims.

What is claimed is:

1. A dielectric composition to be sintered at low temperature, the dielectric composition comprising:
$BaTiO_3$ as a major component; and
a minor component,
wherein
the minor component is contained in a content of 0.1 mol % to 2.0 mol % based on 100 mol % of the major component, and
the minor component is at least one selected from a group consisting of $Li_6CuO_4$, $Li_2CuO_2$, and $Li_2Cu_2O_3$, or a mixture thereof.

2. The dielectric composition of claim 1, wherein the minor component is contained in a content of 0.1 mol % to 1.0 mol % based on 100 mol % of the major component.

3. The dielectric composition of claim 1, wherein the minor component has a melting point of 1020° C. or lower.

4. The dielectric composition of claim 1, further comprising:
1.0 mol % of BaO;
0.3 mol % of $SiO_2$; and
1.0 mol % of $Al_2O_3$, as first auxiliary components, based on 100 mol % of the major component.

5. The dielectric composition of claim 1, further comprising:
1.0 mol % of $Mn_3O_4$;
1.1 mol % of $ZrO_2$; and
5.2 mol % of $Dy_2O_3$, as second auxiliary components, based on 100 mol % of the major component.

6. A multilayer ceramic electronic component, comprising:
a multilayer body formed by stacking a plurality of dielectric layers containing $BaTiO_3$ as a major component and as a minor component;
first and second internal electrodes alternately stacked on the dielectric layers and having different polarities;
a first external electrode formed on a surface of the multilayer body to be electrically connected to the first internal electrodes; and
a second external electrode formed on a surface of the multilayer body opposing the surface thereof having the first external electrode formed thereon to be electrically connected to the second internal electrodes,
wherein
the minor component is contained in a content of 0.1 mol % to 2.0 mol % based on 100 mol % of the major component, and
the minor component is at least one selected from a group consisting of $Li_6CuO_4$, $Li_2CuO_2$, and $Li_2Cu_2O_3$, or a mixture thereof.

7. The multilayer ceramic electronic component of claim 6, wherein the minor component is contained in a content of 0.1 mol % to 1.0 mol % based on 100 mol % of the major component.

8. The multilayer ceramic electronic component of claim 6, wherein the minor component has a melting point of 1020° C. or lower.

9. The multilayer ceramic electronic component of claim 6, wherein the dielectric layers have a degree of densification of 97% or higher.

10. The multilayer ceramic electronic component of claim 6, wherein the dielectric layers further contain:
1.0 mol % of BaO;
0.3 mol % of $SiO_2$; and
1.0 mol % of $Al_2O_3$, as first auxiliary components, based on 100 mol % of the major component.

11. The multilayer ceramic electronic component of claim 6, wherein the dielectric layers further contain:
1.0 mol % of $Mn_3O_4$;
1.1 mol % of $ZrO_2$; and
5.2 mol % of $Dy_2O_3$, as second auxiliary components, based on 100 mol % of the major component.

* * * * *